No. 761,310. Patented May 31, 1904.

UNITED STATES PATENT OFFICE.

WALTHER LOEB, OF BONN, GERMANY, ASSIGNOR TO C. F. BOEHRINGER & SOEHNE, OF MANNHEIM-WALDHOF, BADEN, GERMANY, A FIRM.

PREPARATION OF AZO DYES.

SPECIFICATION forming part of Letters Patent No. 761,310, dated May 31, 1904.

Application filed March 16, 1903. Serial No. 147,973. (No specimens.)

*To all whom it may concern:*

Be it known that I, WALTHER LOEB, a citizen of the German Empire, residing at Bonn, Germany, have invented certain new and useful Improvements in the Preparation of Azo Dyes; and I do hereby declare the following to be a full, clear, and exact description of the invention, such as will enable others skilled in the art to which it appertains to make and use the same.

As is known, azo bodies have hitherto been prepared by dissolving or suspending an amin in acid solution, diazotizing the same at a low temperature by means of a nitrite, and mixing the diazotized solution with the solution of what is known in the art as a "coupling" compound. Coupling is the property which certain bodies (among them the amins and phenols) possess of combining with diazo compounds to form azo compounds. Coupling compounds are the compounds which take part in such combination—for example, amins or phenols on the one hand and diazo bodies on the other.

I have succeeded in preparing azo dyes electrochemically in one process by combining diazotation and coupling of the amin with a compound of acid character in the same solution under the influence of the electric current. The principle of the operation depends upon the discharge of $NO_2$ anions in a nitrite bath at the anode. When an amin is present, diazotation of said amin takes place. The diazo compounds so formed are, however, very unstable under these circumstances for the reason that the oxidizing effect of the current, the solution itself, and the resulting higher temperature all combine to rapidly decompose diazo bodies. I have found that by employing coupling compounds in connection with the above diazotizing reaction on an amin I can obtain a stable azo dye. If one of the first class of coupling compounds having an acid character is present when the above diazotation of the amin takes place, such coupling compound will combine at once with the diazo compound which is formed, producing thereby the corresponding azo compound or dye. The amins cannot be used in my process for the purpose of coupling, since they are by their properties and character naturally subject to the action of the discharged $NO_2$ ions or, in other words, to diazotation. The process may be explained by assuming that the reaction of coupling takes place at a much greater rate than the decompositions of the diazo bodies, as mentioned above.

The technical advantages of this new process compared with the purely chemical process are, first, that the three solutions formerly employed (solution of nitrite, solution of the amin solution of the coupling compound) are replaced by a single one; secondly, that cooling apparatus, as required by the old methods, may be readily dispensed with, since the rise of temperature is only of advantage in my process.

The method of carrying out my invention involves, preferably, though not necessarily, the separation of the bath-cell employed by a diaphragm into an anode and cathode chamber and pouring into the former, the anode-chamber, an amin, the coupling compound, (preferably in the form of a soluble salt,) and nitrite, (preferably in the required molecular proportions,) all in aqueous solution or suspension. It is advantageous to start with a neutral solution, the electrolysis being then carried out without further addition to the bath. The reaction, generally speaking, is represented by the following equation:

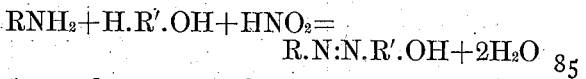
$RNH_2 + H.R'.OH + HNO_2 =$
$R.N:N.R'.OH + 2H_2O$

As anode material platinum is the most suitable. The cathode may be of any metal. The conditions of current may be largely varied. The anode solution is kept well stirred during the operation.

In the following detail description I have illustrated my invention by examples which embody what I consider the preferable manner of carrying the same into effect.

I. *Preparation of the sodium salt of anilinazo-2-naphthol-3.6-disulfonic acid, (Ponceau*

2 G).—For the anode-bath ten parts, by weight, of anilin, 32.7 parts, by weight, of "R-acid," ($\beta$-naphthol-disulfonic acid,) and 9.1 parts, by weight, potassium nitrite are mixed and stirred with one hundred parts of water, the whole being subject to the action of an electrolytic current passed in at the platinum anode. The cathode-bath consists of a dilute solution of potassium hydrate, the cathode of nickel. After rather more current than is necessary to decompose the nitrite has passed the cell the process is interrupted, and from the deep-red anode solution the dye (Ponceau 2G) is isolated by known methods. The reaction in this case proceeds according to the equation:

$$C_6H_5.NH_2 + C_{10}H_5.OH(SO_3H)_2 + HNO_2 =$$
$$C_6H_5.N:N.C_{10}H_4.OH(SO_3H)_2 + 2H_2O$$

The current density may be varied from 0.5 to 7.5 amperes per square decimeter, the temperature from 40° to 90° centigrade. If the cell is divided by a diaphragm into an anode and a cathode chamber, the above two baths are of course placed into the respective chambers—i. e., the first bath into the anode-chamber and the cathode-bath into the cathode-chamber.

Further examples embodying my invention are given in the following tabular arrangement, it being understood that the anode-baths there given are treated as in the above example and that a dilute solution of potassium hydrate is preferably used therewith as the cathode-bath.

| Anode solution. | Temperature, degrees C. | Resulting dye. |
| --- | --- | --- |
| II. 10 parts benzidin. 33 parts naphthionic acid. 9.3 parts potassium nitrite. 100 parts water. | 60°–90° | The dyestuff (Congo) separates in the course of electrolysis. |
| III. 10 parts diamisidin. 13.6 parts sodium salt of $\beta$-naphthol. 7 parts potassium nitrite. 100 parts water. | 60°–90° | The deep violet dye separates from the solution during the electrolysis. |
| IV. 8 parts naphthylamin sulf. acid (1.4.) 10.7 parts R-acid. 3 parts KNO₂. 100 parts water. | 40° | The dye may be separated from the deep-red solution by direct evaporation or by the addition of salt to the solution. |
| V. 11 parts sodium salt of toluylene-diamin sulf. acid. 11 parts R-acid. 6.2 parts KNO₂. 100 parts water. | 15°–30° | The coloring-matter may be isolated from the deeply-colored liquor, as in Ex. IV. |
| VI. 11 parts sodium salt of sulfanilic acid 8.5 parts $\alpha$-naphthol sodium salt. 4.4 parts KNO₂. 100 parts water. | 15°–30° | From the red solution the dye (tropaeolin 000, No. 1) is obtained by evaporation or by adding salt to the solution. |
| VII. 10 parts sodium salt of 1.4-naphthylamin-sulfonic acid. 6.8 parts sodium salt of $\beta$-naphthol. 3.6 parts KNO₂. 100 parts water. | 15°–30° | The dye (Roccelline) may be separated from the solution by addition of acids. |
| VIII. 9.2 parts benzidin. 31.6 parts azo compound prepared from sulfanilic acid and resorcin. 6.9 parts sodium nitrite. 100 parts water. | 20°–90° | The dye (Hessian brown) may be isolated from the solution by known methods. |

What I claim, and desire to secure by Letters Patent of the United States, is—

1. In the art of preparing azo compounds, the step which consists in submitting an amin to the anode action of the electric current.

2. In the art of preparing azo compounds, the process which consists in diazotizing the starting material by the anode action of an electric current and coupling the resultant diazo compound.

3. In the art of preparing azo compounds, the process which consists in subjecting an amin in nitrite-bath to the anode action of an electric current.

4. In the art of preparing azo compounds, the process which consists in diazotizing the starting material by the anode action of an electric current and concurrently coupling the resultant diazo compound.

5. In the art of preparing azo compounds, the process which consists in submitting an amin in a nitrite-bath to the anode action of an electric current and concurrently reacting thereon with a coupling compound.

6. In the art of preparing azo compounds, the process which consists in submitting an amin in a nitrite-bath to the anode action of an electric current in the presence of a coupling compound.

7. In the art of preparing azo compounds, the process which consists in submitting an amin in a nitrite-bath to the anode action of an electric current and concurrently reacting thereon with an acid coupling compound.

8. In the art of preparing azo compounds, the process which consists in submitting an amin in a nitrite-bath to the anode action of an electric current in the presence of an acid coupling compound.

9. The process of preparing azo dyes which consists in subjecting a mixture of amin, nitrite and acid coupling compound in an aqueous bath to the anode influence of the electric current.

10. The process of preparing azo dyes which consists in subjecting a mixture of amin, nitrite and acid coupling compound, in the required molecular proportions, in an aqueous bath to the anode action of an electric current.

11. The process of preparing azo dyes which consists in subjecting a mixture of amin, nitrite and salt of an acid coupling compound, in the required molecular proportions, in an aqueous bath to the action of an electric current.

12. The process of preparing azo dyes which consists in subjecting a mixture of amin, nitrite and acid coupling compound, in the required molecular proportions, in an aqueous bath to the anode action of an electric current, and separating the dye thus formed from the bath by suitable methods.

13. The process of preparing the azo dye "Ponceau 2G" by subjecting a mixture of the following ingredients in the weight proportions substantially as stated: anilin, ten parts, $\beta$-naphthol-disulfonic acid, 32.7 parts, potassium nitrite, 9.1 parts and water one hundred parts, to the anode action of an electric current.

14. The process of preparing the azo dye "Ponceau 2G" by subjecting a mixture of the following ingredients in the weight proportions substantially as stated: anilin, ten parts, $\beta$-naphthol-disulfonic acid, 32.7 parts, potassium nitrite, 9.1 parts and water one hundred parts, to the anode action of an electric current in the presence of a platinum cathode.

In testimony whereof I affix my signature in presence of two witnesses.

WALTHER LOEB.

Witnesses:
W. FRHR. VON LYNCKER,
CARL SCHMITT.